Jan. 22, 1963
M. MAYRATH
3,074,535
AUGER CONVEYOR CARRIAGE
Filed April 24, 1961
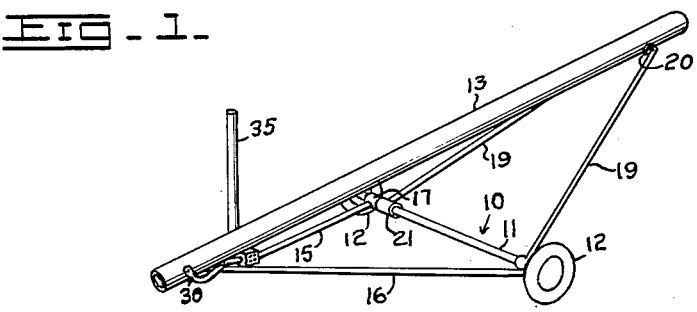
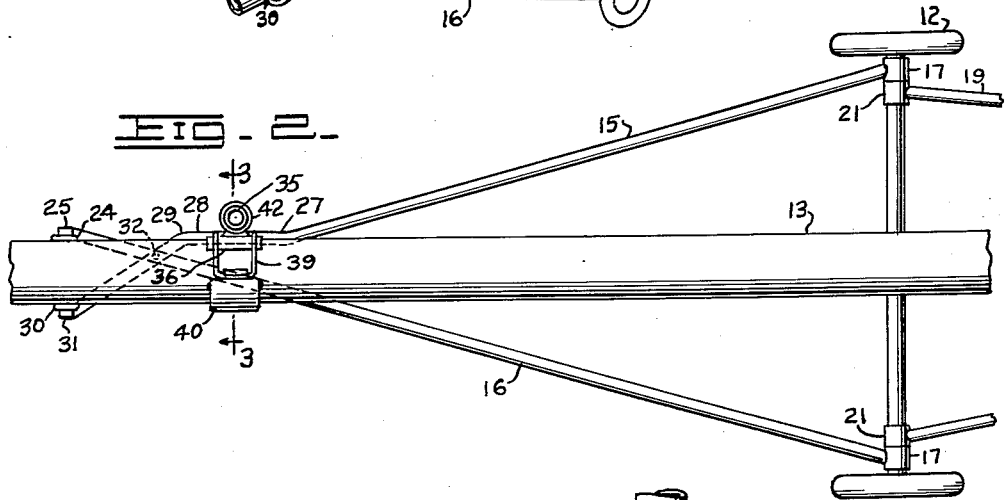
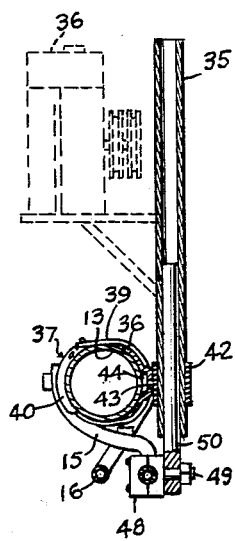
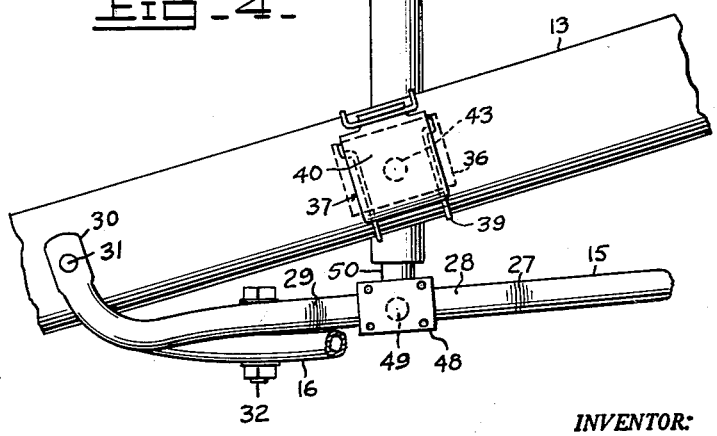
INVENTOR:
MARTIN MAYRATH
BY
Homer R. Montague
ATT'Y.

United States Patent Office 3,074,535
Patented Jan. 22, 1963

3,074,535
AUGER CONVEYOR CARRIAGE
Martin Mayrath, 10707 Lennox Lane, Dallas, Tex.
Filed Apr. 24, 1961, Ser. No. 105,186
13 Claims. (Cl. 198—120.5)

This invention relates to an auger conveyor carriage and more particularly to a new type of radius rods for such carriage and means associated therewith for supporting appurtenant mechanisms such as a motor for driving the conveyor auger.

Various devices have been proposed for supporting the motors employed for driving the augers of conveyors, and problems have been involved in this phase of manufacture of auger conveyors. For example, the means employed is often quite cumbersome and expensive to manufacture and difficulties are encountered in maintaining the motor in proper vertical position. This is particularly true in view of the fact that in conveyors of this type, employing radius rods connected between a wheeled axle and one end of the conveyor and supporting rods connected to the other end of the conveyor, the conveyor tube is changed as to angularity to determine the level of intake and discharge of the conveyor.

An important object of the present invention is to provide a novel form of radius rods for a conveyor of this type wherein the radius rods cross and are secured to each other intermediate their lengths, thus adding strength to the radius rods and tending to keep the tube from rocking or turning on its axis.

A further object is to provide such a construction wherein the radius rods and the conveyor tube combine to support elements for carrying a driving motor in a highly simplified and efficient manner.

A further object is to provide such a simplified construction wherein the angularity between the radius rods and supporting rods may be changed to raise or lower the discharge end of the conveyor without materially changing the angularity of the motor.

A further object is to provide a construction of this character wherein the motor is supported by a substantially vertical member carried by the conveyor tube and so connected to means carried by one of the radius rods as to maintain the vertically extending member approximately in vertical position for any angularly adjusted position of the conveyor tube.

Other objects and advantages of the invention will become apparent during the course of the following description.

In the drawings I have shown one embodiment of the invention. In this showing:

FIGURE 1 is a perspective view of a conveyor of the type referred to, parts being omitted;

FIGURE 2 is an enlarged fragmentary plan view of a portion of the conveyor and carriage showing the invention applied;

FIGURE 3 is a vertical sectional view on line 3—3 of FIGURE 2; and

FIGURE 4 is an enlarged fragmentary side elevation of a portion of the conveyor tube and radius rods showing the invention applied.

Referring to FIGURE 1, the numeral 10 designates a conveyor carriage as a whole comprising an axle assembly 11 carrying supporting wheels 12 at the ends thereof. A conveyor tube 13 is arranged above the carriage and has therein the usual conveyor auger (not shown).

One end of the conveyor tube, namely the forward or lower end, is supported by a pair of radius rods 15 and 16 having collars 17 at their rear ends rotatably surrounding the axle structure 11. The forward ends of the radius rods are pivotally connected to the tube 13 as described below.

The rear end of the tube 13 is supported by arms 19 provided at their rear ends with rollers 20 or similar means engaging the tube 13 to permit the rear ends of the arms 19 to move longitudinally of the tube 13. This is conventionally accomplished by cables connected between the radius rods and supporting arms 19 to vary the angularity therebetween, the cables being operated by a windlass. The cables and windlass are conventional and have been omitted from the drawing. To provide for swinging movement of the arms 19, the forward ends of the latter are provided with collars 21 rotatably surrounding the axle structure 11.

The radius rod 16 is relatively straight from end to end and crosses through the vertical plane of the axis of the tube 13. The forward end 24 of such radius rod is curved to fit around a portion of the tube 13 and is pivoted thereto as at 25. The radius rod 15 converges toward the tube 13 forwardly of the conveyor and is bent as at 27, from which point it is provided with a straight portion 28 which, while it converges upwardly toward the axis of the tube 13, lies in a vertical plane parallel to the vertical plane of the axis of the tube 13 as will be apparent in FIGURE 2. At the forward end of the portion 28, the radius rod 15 is bent as at 29 to extend across and beneath the tube 13 and terminates in an upwardly curved end 30, pivoted as at 31 to the tube 13 coaxially with the pivot 25. Obviously the radius rods cross each other beneath the tube and are bolted together as at 32 (FIGURE 4).

A vertically extending pipe or post 35 extends upwardly alongside the tube 13 as shown in FIGURES 2, 3 and 4 and acts as a support for an engine 36 shown in dotted lines in FIGURE 3. This support has its weight and the weight of the engine carried by the tube 13 by suitable means which permit the support 35 to pivot about a horizontal axis transverse to the tube 13. In the drawings there is shown a fitting 36 formed arcuately to conform generally to the curvature of the tube 13 and clamped thereto by any suitable type of clamping device 37, preferably of the snap-over or over-center type including heavy clamping wires 39 connected at suitable points to a handle 40 adapted to be swung downwardly toward the tube 13 when in clamping position.

A sleeve 42 surrounds and is welded or otherwise secured to the support 35 and carries a pin 43 pivotally connected to the fitting 36, the pin 43 having a head 44 arranged in a recess formed in the fitting 36.

A split collar 48 is clamped about the radius rod 15 within the limits of the straight section 28 and carries a laterally projecting pin 49 extending through a control rod 50 having an upper portion of substantial length slidable in the support 35.

*Operation*

A typical position of the parts is shown in FIGURES 1 and 3, the lower end of the tube 13 extending substantially to ground level for the intake of grain or other material to be conveyed through the tube 13 and discharged from the upper end thereof. As previously stated, the height of the discharge end of the tube 13 is controlled by varying the angularity between the radius rods 15 and 16 and the supporting rods 19. Assuming that the height of the upper or discharge end of the conveyor tube 13 is varied, for example by decreasing the angularity between the radius rods and supporting arms, the distance between the pivot pins 43 and 49 will increase and the support 35 will slide upwardly relative to the rod 50. There will be a negligible horizontal component of movement of the pivot pin 43, but the support 35 will not move appreciably out of a vertical position and never to an extent sufficient to affect the operation of the motor 36, which is connected in any suitable conventional way to drive the conveyor auger (not shown). Since the portion 28 of the radius rod 15 is in a vertical plane parallel to the vertical plane of the axis of the tube, the clamp 37 may be loosened to move the engine longitudinally of the tube 13 to take up belt stretch, etc. or for changing pulley sizes, and the clamp 48 may be loosened and correspondingly moved along the radius rod portion 28 to again level the engine. Such adjustment of the parts is not necessary during normal operation of the mechanism even though the height of the discharge end of the tube is varied, as indicated above.

The crossing of the radius rods and the pinning or bolting of such rods to each other where they cross gives additional strength to the radius rods since the latter are connected to the auger tube on opposite sides thereof and connected to each other rearwardly of the pivot points of the radius rods to the auger tubes. This arrangement not only provides the radius rods with additional strength, but the rigidity of the radius rods prevents the tube 13 from rolling or rocking on its axis.

From the foregoing it will be apparent that the present construction provides a highly simplified form of engine mounting which functions to keep the engine at or very close to a vertical position and which provides ready means for the shifting of the engine without changing its vertical position if it becomes necessary to take up belt stretch, employ a non-standard length belt or change a pulley size. Moreover, the radius rods per se function in themselves to provide a rigid support for the inlet end of the auger tube, as stated above.

It is to be understood that the form of the invention shown and described is to be taken as a preferred example of the same and that various changes in the shape, size and arrangement of the parts may be made as do not depart from the spirit of the invention or the scope of the appended claims.

What is claimed is:

1. A conveyor having an auger tube and a carriage therefor comprising an axle assembly beneath and extending transversely of said tube and having wheels at its ends, and two pairs of arms connected to said axle assembly and converging toward each other and toward said tube for mechanical engagement with the respective ends of said tube, one set of arms crossing each other intermediate their ends as viewed from above the conveyor, and being fixed to each other adjacent the crossing location.

2. A conveyor comprising an auger tube and a carriage therefor, such carriage comprising an axle assembly having widely spaced wheels at its ends and extending transversely of and beneath said tube, a pair of supporting arms connected at one end to said axle assembly and converging toward each other and toward said tube for engagement with one end thereof, and a pair of radius rods connected at widely spaced points at one end to said axle assembly and converging and crossing each other substantially horizontally at a point beneath said tube whereby each radius rod has its other end arranged at the side of said tube opposite said one end, said other ends of said rods being pivotally connected to said tube.

3. A conveyor according to claim 2 wherein the crossing point of said radius rods is relatively close to said other ends thereof.

4. A conveyor comprising an auger tube and carriage therefor, such carriage comprising an axle assembly having widely spaced wheels at its ends and extending transversely of and beneath said tube, a pair of supporting arms connected at one end to said axle assembly and converging toward each other and toward said tube for engagement with one end thereof, a pair of radius rods connected at widely spaced points at one end to said axle assembly, the other ends of said radius rods being pivotally connected to said tube at opposite sides thereof adjacent said other ends, a substantially vertical support carried by said tube adjacent one side thereof, and means carried by one of said radius rods and engaging said support for maintaining it in substantially vertical position.

5. A conveyor according to claim 4 wherein said support is tubular, said means for maintaining said support in substantially vertical position comprising a rod slidable in said tube and having pivotal connection with one of said radius rods.

6. A conveyor comprising an auger tube and carriage therefor, such carriage comprising an axle assembly having widely spaced wheels at its ends and extending transversely of and beneath said tube, a pair of supporting arms connected at one end to said axle assembly and converging toward each other and toward said tube for engagement with one end thereof, a pair of radius rods connected at widely spaced points at one end to said axle assembly, the other ends of said radius rods being pivotally connected to said tube at opposite sides thereof adjacent said other ends, a releasable clamp carried by and surrounding said tube, a substantially vertical support pivotally connected to said clamp, and means carried by one of said radius rods and engageable with said support for maintaining it in substantially vertical position.

7. A conveyor comprising an auger tube and carriage therefor, such carriage comprising an axle assembly having widely spaced wheels at its ends and extending transversely of and beneath said tube, a pair of supporting arms connected at one end to said axle assembly and converging toward each other and toward said tube for engagement with one end thereof, a pair of radius rods connected at widely spaced points at one end to said axle assembly, the other ends of said radius rods being pivotally connected to said tube at opposite sides thereof adjacent said other ends, a releasable clamp carried by and surrounding said tube, a substantially vertical support pivotally connected to said clamp, one of said radius rods having a portion of appreciable length beneath said clamp lying in a vertical plane parallel to the vertical plane of the axis of said tube, a second releasable clamp carried by said portion of said one radius rod, and means pivoted to said second releasable clamp and engaging said support for maintaining it in substantially vertical position.

8. A conveyor according to claim 7 wherein said support is tubular, said means for maintaining said support in substantially vertical position comprising a rod slidable upwardly through the lower end of said tube.

9. A conveyor comprising an auger tube and a carriage therefor, such carriage comprising an axle assembly having widely spaced wheels at its ends and extending transversely of and beneath said tube, a pair of supporting arms connected at one end to said axle assembly and converging toward each other and toward said tube for engagement with one end thereof, a pair of radius rods connected at widely spaced points at one end to said axle assembly and converging and crossing each other horizontally at a point beneath said tube whereby each radius rod has its other end arranged at the side of said tube opposite said one end of the rod, said other ends of said rods being pivotally connected to said tube, a support carried by said tube, and means carried by one of said radius rods between the crossing point of said rods and said one end thereof engaging said support for maintaining the latter in substantially vertical position.

10. A conveyor comprising an auger tube and a carriage therefor, such carriage comprising an axle assembly having widely spaced wheels at its ends and extending transversely of and beneath said tube, a pair of supporting arms connected at one end to said axle assembly and converging toward each other and toward said tube for engagement with one end thereof, a pair of radius rods connected at widely spaced points at one end to said axle assembly and converging and crossing each other horizontally at a point beneath said tube whereby each radius rod has its other end arranged at the side of said tube opposite said one end of the rod, said other ends of said rods being pivotally connected to said tube, one of said radius rods being provided between said crossing point and said axle with a portion of appreciable length lying in a vertical plane parallel to the vertical plane of said tube, a substantially vertical support carried by said tube and adjustable therealong above said portion of said one radius rod, and means carried by said portion of said one radius rod and adjustable therealong and engaging said support to maintain the latter substantially vertical.

11. A conveyor according to claim 10 wherein said support is tubular and pivoted relative to said tube, said means for maintaining said support substantially vertical comprising a rod slidable in said tubular support and having pivotal connection with said portion of said one radius rod.

12. A conveyor comprising an auger tube and a carriage therefor, such carriage comprising an axle assembly having widely spaced wheels at its ends and extending transversely of and beneath said tube, a pair of supporting arms connected at one end to said axle assembly and converging toward each other and toward said tube for engagement with one end thereof, a pair of radius rods connected at widely spaced points at one end to said axle assembly and converging and crossing each other horizontally at a point beneath said tube whereby each radius rod has its other end arranged at the side of said tube opposite said one end of the rod, said other ends of said rods being pivotally connected to said tube, one of said radius rods being provided between said crossing point and said axle with a portion of appreciable length lying in a vertical plane parallel to the vertical plane of said tube, a releasable clamp carried by said tube above said portion of said one radius rod, a vertical support carried by and pivoted to said releasable clamp, a second releasable clamp carried by said portion of said one radius rod, and means pivoted to said second releasable clamp and engaging said support for maintaining the latter in substantially vertical position.

13. A conveyor according to claim 12 wherein said support is tubular, said means for maintaining said support substantially vertical comprising a rod pivoted to said second releasable clamp and slidable in the lower end of said support.

References Cited in the file of this patent
UNITED STATES PATENTS

| | | |
|---|---|---|
| 2,551,147 | Mayrath | May 1, 1951 |
| 2,769,525 | Herscovitch | Nov. 6, 1956 |